No. 619,511. Patented Feb. 14, 1899.
J. C. SHARP.
STUMP EXTRACTING DEVICE.
(Application filed Apr. 9, 1898.)
(No Model.) 2 Sheets—Sheet 2.
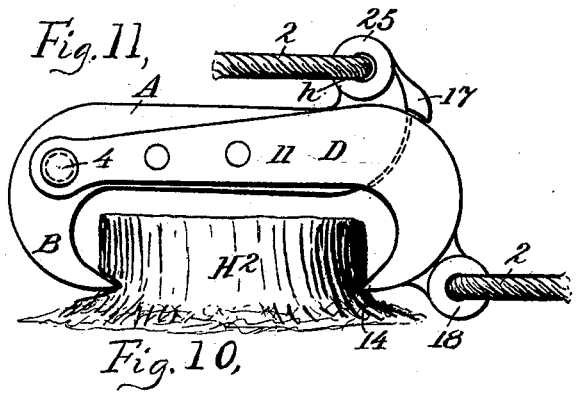
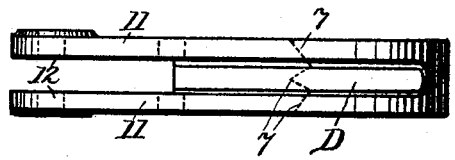
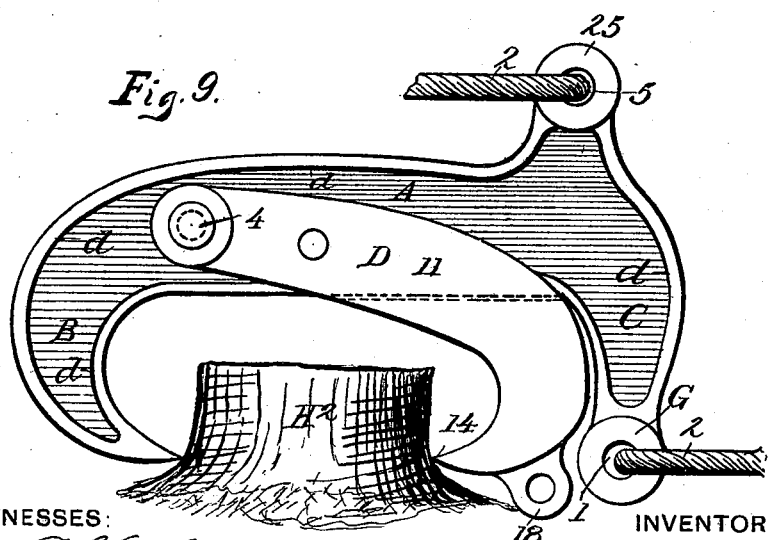
WITNESSES: INVENTOR

UNITED STATES PATENT OFFICE.

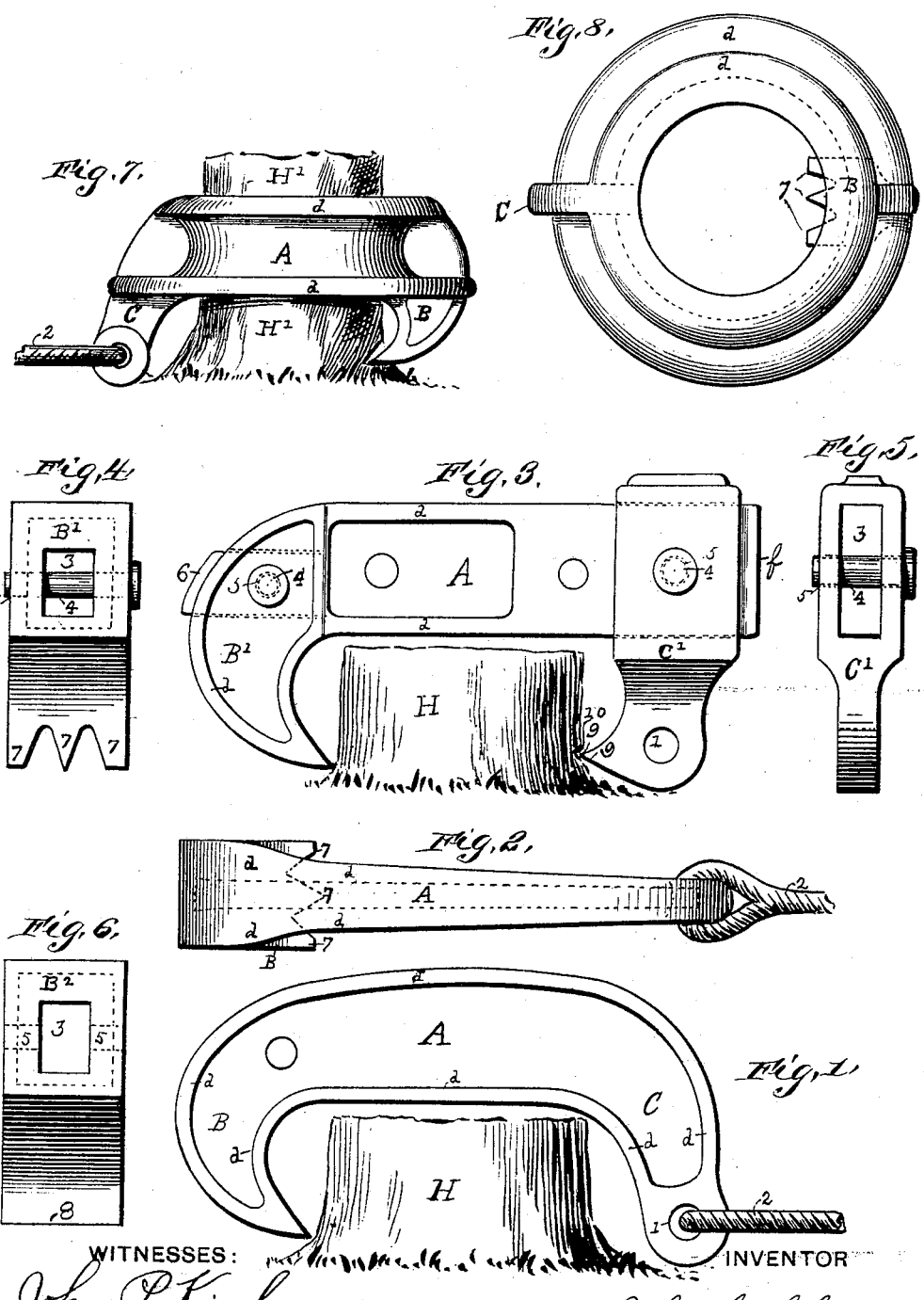

JOHN C. SHARP, OF DELAVAN, WISCONSIN.

STUMP-EXTRACTING DEVICE.

SPECIFICATION forming part of Letters Patent No. 619,511, dated February 14, 1899.

Application filed April 9, 1898. Serial No. 677,255. (No model.)

*To all whom it may concern:*

Be it known that I, JOHN C. SHARP, a citizen of the United States of America, residing at Delavan, in the county of Walworth and State of Wisconsin, have invented certain new and useful Improvements in Stump-Extracting Devices, of which the following is a specification.

The object of my invention is to provide a cheap and handy device to be used in connection with the draft-cable of a stump-extracting machine for extracting stumps; and my invention consists of certain details which are hereinafter described and claimed.

In the accompanying drawings, illustrating my invention, in which similar numerals and letters of reference indicate like parts, Figure 1 is a side elevation of my device, showing it in position to pull the stump H. Fig. 2 is a top or plan view of my device, but does not show the stump to be operated upon. Fig. 3 is a plan view of a modified form of my device, showing the downwardly-projecting parts B' and C' detachably connected to the horizontal draft-bar A. Fig. 4 is an inner end view of the downwardly-projecting part B' detached from the horizontal draft-bar A. Fig. 5 is an outer or rear view of the downwardly-projecting part C' detached from the horizontal draft-bar A. Fig. 6 is an inner end view of a modified form of the part B' detached from the horizontal draft-bar A. Fig. 7 is a side elevation of my device, showing a central opening in the horizontal draft-bar A to let the upper part of the stump H' project through; and Fig. 8 is a plan view of my device shown in Fig. 7, but in Fig. 8 the stump is not shown. Fig. 9 is a side elevation of my device, showing an auxiliary hook D pivotally attached to the horizontal draft-bar A and also shows a stump H² to be pulled. Fig. 10 is a separate plan view of the auxiliary hook D that is shown in side elevation in Fig. 9 pivotally connected to the horizontal draft-bar A. Fig. 11 is a side elevation of my device, showing the horizontal draft-bar slightly modified, one end thereof being turned upwardly and with an eye on it for attachment of the draft-cable, and shows a stop 17 to prevent the auxiliary hook D from swinging too far upwardly on its pivotal attachment to said draft-bar when the draft-cable is attached to the eye 18 of the auxiliary hook D. This construction of my device renders it possible to pull from either of the two directions.

My device for extracting stumps is made of suitable metal, preferably of kind that can be cast, and has a horizontally-disposed draft-bar A and a downwardly-projecting hook-shaped part B at one end of said draft-bar, and at the other end has another downwardly-projecting part C, with an eye 1 or other suitable means for attaching a draft-cable 2. The draft-bar A may be provided with a lateral flange or rib $d$, cast on it to strengthen it laterally.

In some cases I make the downwardly-projecting parts B' and C' in separate pieces and provide openings 3 to fit over the ends of the draft-bar A and secure them thereto by means of the cross-pin 4, which passes through suitable holes 5 made in the said parts and through the draft-bar, as shown. In Fig. 3 the draft-bar has a tongue part 6 made on it to pass through the opening 3 of the separate downwardly-projecting parts B' and C', with a hole 5 in said tongue to receive the said cross-pin 4.

The downwardly-projecting parts B and B' are preferably made with broad points and with two or more teeth 7 thereon, as shown, to prevent the hook from slipping around the side of the stump and also prevent it from cutting the stump off when it is not desirable to do so.

The downwardly-projecting part B' has no teeth, but has a cutting edge 8 for cutting off below the top of the ground stumps that are too much decayed to be otherwise handily and successfully gotten out low enough, so the plow will not strike them when the ground is being plowed.

In Fig. 3 the downwardly-projecting part C' is shown as adapted to slide on the draft-bar, so the point 9 may be placed in a notch 10 cut in the front of the stump or be set under a root in some cases, the object being to make the hook or device hold well to the stump after it is pulled over on its front side and until it is entirely out of the ground. If the roots of the stump are sound and the upper part of the stump too much decayed to afford a secure hold, the teeth 7 of the hook part may be set under the back of the stump or under a root thereof, it being necessary sometimes to remove a little of the earth to get the teeth effectively placed.

By having the part B project downwardly from the draft-bar, as shown, the draft-cable may be attached lower down or substantially on the same horizontal plane as that in which the point of the hook is set, thus causing the point of the hook to pull more deeply into the back of the stump or under it and with less liability of coming out and letting go of the stump while the latter is turning over on its front side and not yet freed from the ground. It can readily be seen that if, for instance, the draft-cable should be attached directly to the horizontal draft-bar at $f$ the point of the hook would tend to turn and plow upwardly and out of the back of the stump when the latter is being pulled over on its front side and would be likely to let go of the stump before it is entirely out. Furthermore, with the draft-cable attached at $f$ and the strain coming from a machine located on a lower horizontal plane the top of the stump would serve as a fulcrum for the draft-bar to pry the point of the hook upwardly and out of its most effective position at the back of the stump. By making the horizontal draft-bar and parts B', B², and C' in separate pieces the device may thus in sections be more easily handled, and the expense of renewing the whole device is not incurred if but one part should be broken.

If the top of the stump be too much decayed to pull the stump and also too high to let the point of the hook down low enough to get it among the roots or where the wood is more sound, I sometimes use a hook substantially as shown in Figs. 7 and 8, which has an opening in the draft-bar to receive or slip down over the stump. This construction, it will be seen, lets the point of the hook down low, and the downwardly-projecting parts B and C may be made very short and at the same time be light and strong.

When the top of the stump to be pulled is not much decayed, I in some cases add an auxiliary hook D, substantially as shown in Fig. 9, with two sides 11, which are better shown in plan view in Fig. 10. The sides 11 may be provided with openings 12 to receive the cross-pin 4, which also passes through the horizontal draft-bar A, as shown. In this latter construction it will be seen that with the draft-cable attached at G the point 14 of the auxiliary hook D would be forced into the front side of the stump while the latter is being pulled over on its front side, causing the device to hold well to the stump until it is entirely out. For the sake of obtaining greater leverage to pull the stump I could turn the device around so that the point of the auxiliary hook D would be at the back of the stump and attach the draft-cable at $h$ on the upwardly-projecting part 15 of the horizontal draft-bar.

While I have shown and described the preferred form of my device for extracting stumps, I do not wish to be limited thereto, as many modifications thereof could be made without departing from the spirit of my invention.

What I claim as my invention is—

1. In a device for extracting stumps, the combination of a horizontal draft-bar with a part projecting downwardly from one end thereof so as to form a hook, teeth on the point of said hook, and on the other end of said draft-bar a part projecting downwardly therefrom, with suitable means on it for connecting a draft-cable thereto, substantially as shown and described and for purpose set forth.

2. In a device for extracting stumps, the combination of a horizontal draft-bar having a rib or flange projecting laterally therefrom so as to strengthen and stiffen the same, a part projecting downwardly from one end of said horizontal draft-bar so as to form a hook, teeth on the point of the hook, and on the other end of said horizontal draft-bar a part projecting downwardly therfrom with suitable means on it for connecting a draft-cable thereto, substantially as shown and described and for the purpose set forth.

3. In a device for extracting stumps, the combination of a horizontal draft-bar having a central opening made in it to receive the upper end of the stump to be pulled, and upon one side of said horizontal draft-bar a part projecting downwardly therefrom so as to form a hook, and on the opposite side of said horizontal draft-bar suitable means for connecting a draft-cable thereto, substantially as shown and described and for the purpose set forth.

4. In a device for extracting stumps, the combination of a horizontal draft-bar having a central opening made in it to receive the upper end of the stump to be pulled, and upon one side of said horizontal draft-bar a part projecting downwardly therefrom so as to form a hook, and upon the opposite side of said horizontal draft-bar suitable means for connecting a draft-cable thereto, and said draft-bar also having a rib or flange projecting laterally therefrom so as to strengthen and stiffen the same, substantially as shown and described and for the purpose set forth.

5. In a device for extracting stumps, the combination of a horizontal draft-bar having a central opening made in it to receive the upper part of the stump to be pulled, and on one side of said horizontal draft-bar a part projecting downwardly therefrom so as to form a hook, teeth on the point of said hook part, and on the opposite side of said horizontal draft-bar suitable means for connecting a draft-cable thereto, substantially as shown and described and for the purpose set forth.

6. In a device for extracting stumps, the combination of a horizontal draft-bar having a central opening made in it to receive the upper part of the stump to be pulled, and on one side of said horizontal draft-bar a part projecting downwardly therefrom so as to form a hook, teeth on the point of said hook part, suitable means on the opposite side of said horizontal draft-bar for connecting a draft-cable thereto, and a rib or flange projecting laterally from said horizontal draft-bar for strengthening and stiffening the same, substantially as shown and described and for the purpose set forth.

7. In a device for extracting stumps, the combination of a horizontal draft-bar having a central opening made in it to receive the upper end of the stump to be pulled, and on one side of said horizontal draft-bar a part projecting downwardly therefrom so as to form a hook, and on the opposite side of said horizontal draft-bar a part projecting downwardly therefrom, with suitable means on it for connecting a draft-cable thereto, substantially as shown and described and for the purpose set forth.

8. In a device for extracting stumps the combination of a horizontal draft-bar having a central opening made in it to receive the upper part of a stump to be pulled, and on one side of said horizontal draft-bar a part projecting downwardly therefrom so as to form a hook, and on the opposite side of said horizontal draft-bar a part projecting downwardly therefrom, with suitable means on it for connecting a draft-cable thereto, and said horizontal draft-bar having a rib or flange projecting laterally therefrom to strengthen and stiffen the same, substantially as shown and described and for the purpose set forth.

9. In a stump-extracting device, the combination of a horizontal draft-bar having a central opening made in it to receive the upper part of the stump to be pulled, and on one side of said horizontal draft-bar a part projecting downwardly therefrom so as to form a hook, teeth on the hook part, and on the opposite side of said horizontal draft-bar a part projecting downwardly therefrom with suitable means on it for connecting a draft-cable thereto, substantially as shown and described and for the purpose set forth.

10. In a device for extracting stumps, the combination of a horizontal draft-bar having a central opening made in it to receive the upper part of the stump to be pulled, and on one side of said horizontal draft-bar a part projecting downwardly therefrom so as to form a hook, teeth on the point of said hook part, and on the opposite side of said horizontal draft-bar a part projecting downwardly therefrom with suitable means on it for connecting a draft-cable thereto, and said horizontal draft-bar having a rib or flange projecting laterally therefrom to strengthen and stiffen the same, substantially as shown and described and for the purpose set forth.

JOHN C. SHARP.

Witnesses:
 WM. H. PIER,
 LESLIE G. SHARP.